Inventor:
Michael G. Stratton
by John F. Smith
Attorney

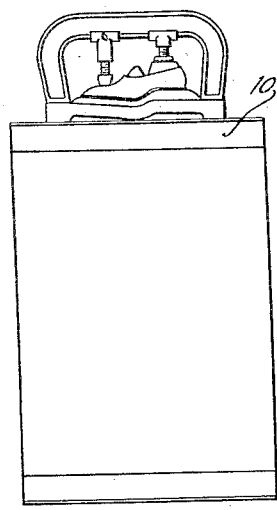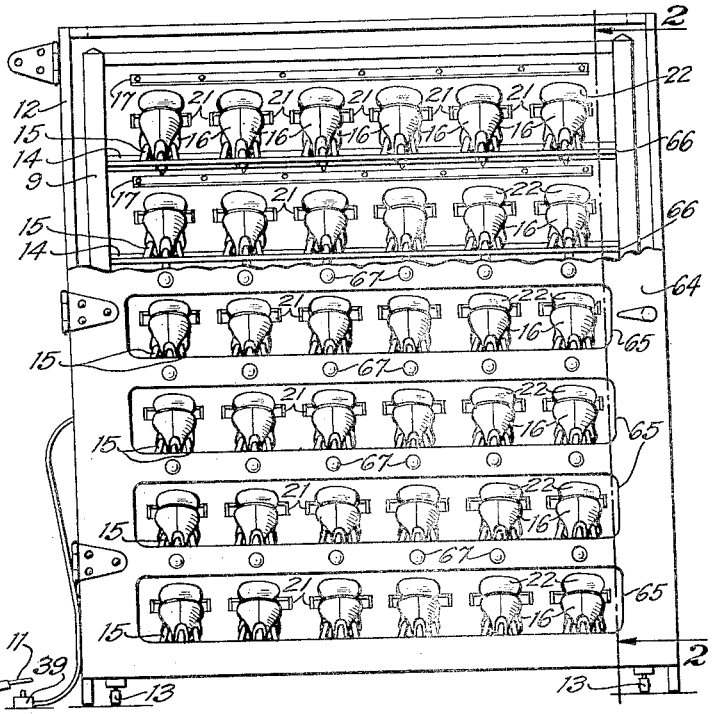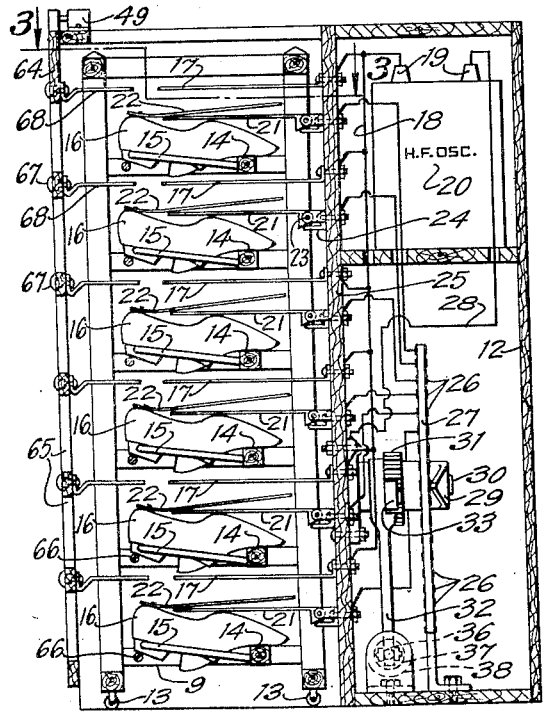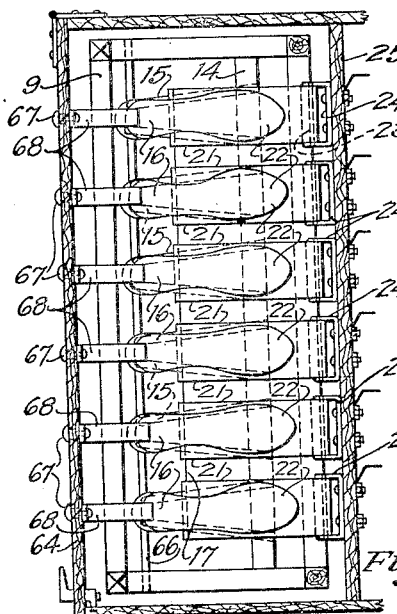
Fig. 1. Fig. 2. Fig. 3.
Inventor:
Michael G. Stratton
by John T. Smith
Attorney May 28, 1946.   M. G. STRATTON   2,401,277
ELECTROSTATIC HEATING APPARATUS
Filed April 4, 1944   2 Sheets-Sheet 2

Patented May 28, 1946

2,401,277

UNITED STATES PATENT OFFICE 2,401,277

ELECTROSTATIC HEATING APPARATUS

Michael G. Stratton, Weston, Mass., assignor to Compo Shoe Machinery Corporation, Boston, Mass., a corporation of Delaware Application April 4, 1944, Serial No. 529,526

10 Claims. (Cl. 12—36)

This invention relates to electrostatic heating, and relates more particularly to the activation by electrostatic energy of adhesive applied to shoe parts.

As disclosed in the copending application of Harold E. Marasco, Serial No. 526,370, filed March 14, 1944, there are advantages in activating by heat derived from electrostatic energy, the adhesive applied to one shoe part, and then in another step, pressing the shoe parts together with the heated adhesive on one shoe part in contact with colder adhesive on the other shoe part.

This invention adapts the invention disclosed in said application to efficient, low cost, quantity production, and provides, in one embodiment, for the placement of a large number of shoes to which outsoles are to be attached, in horizontal and vertical rows, for the application of electrostatic heat, and for the successive exposure of the adhesive on the inner surface of each outsole to an electrostatic field, in step with the actuation of a standard sole pressing machine to which the shoes are transferred, in succession, after the adhesive on their outsoles has been activated, and in which, the outsoles are pressed against the shoe uppers.

An object of the invention is to heat with electrostatic energy, in succession, parts of articles to be treated, in step with the treatment of articles, the parts of which have previously been heated.

A more definite object of the invention is to activate with electrostatic energy, in succession, adhesive on the attaching surfaces of outsoles of shoes, automatically, and in step with the actuation of a sole pressing machine to which the shoes are transferred in succession after the adhesive on their outsoles has been activated, and in which the outsoles and the shoe uppers are pressed together.

A further object of the invention is to speed up attaching of soles to shoes and to reduce operating costs, by eliminating the step of handling of individual shoes from their racks to an adhesive treater.

Other objects of the invention will in part be obvious and will in part appear hereinafter.

The invention accordingly comprises the features of construction, combination of elements, and arrangements of parts which will be exemplified in the construction hereinafter set forth and the scope of the invention will be indicated in the claims.

For a fuller understanding of the nature and objects of the invention reference should be had to the following detailed description taken in connection with the accompanying drawings, in which:

Fig. 1 is a side elevation of an electronic activator embodying this invention with the upper portion of the front door removed, and in which is contained a large number of shoes having the inner surfaces of their outsoles coated with adhesive, placed alongside a conveyor type sole pressing machine, to which the shoes are transferred in succession, after activation, and in which the outsoles and uppers are pressed together, and the activating foot pedal of which, acts to control the circuit of the high frequency oscillator supplying the electrostatic fields;

Fig. 2 is a sectional view along the lines 2—2 of Fig. 1;

Fig. 3 is a sectional view along the lines 3—3 of Fig. 2;

Figure 4:
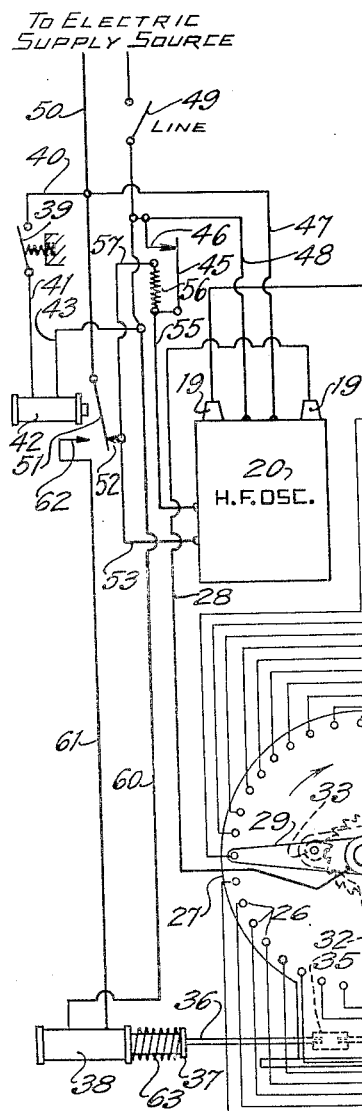
Fig. 4 is a schematic view of the control circuit of the electronic activator of Figs. 1–3.
Figure 5:
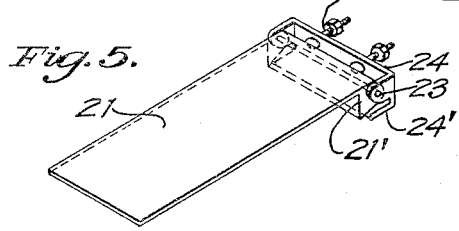
Fig. 5 is an enlarged, projected view of one of the electrodes which is illustrated by Fig. 2 as being placed between each shoe upper and its outsole.
Figure 6:
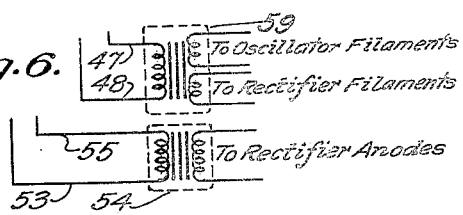
Fig. 6 is a schematic view illustrating the energizing circuits of the power transformers in the oscillator of Fig. 4.

The conveyor type sole pressing machine 10 illustrated by Fig. 1, is a conventional one generally similar to the one disclosed in the J. F. Smith, U. S. Patent No. 2,169,981. The details of the machine are fully disclosed in said patent and it is believed to be sufficient for an understanding of the present invention to state that depression of the foot treadle 11 by the operator of the machine, causes the sole of a shoe placed in the machine to be pressed against the shoe upper and causes the conveyor to advance one position so that another shoe may be placed in the machine.

It is usual with this type of sole pressing machine to receive the shoes to be worked upon, in rows upon a shoe rack, which is wheeled alongside the machine and from which the operator removes one shoe at a time and loads it into the machine.

The invention combines the functions of the usual shoe rack with those of an electronic activator within the housing 12. The standard form of shoe rack 9, as illustrated, is supported on the rollers 13 and contains the six, spaced, parallel shelves 14 to which are attached the tilted shoe supporting members 15 upon which the inverted, lasted shoe uppers 16 are placed. As illustrated by Fig. 1, six uppers 16 may be supported, equally spaced, in a horizontally extending row, by each shelf 14.

The rack 9, with its plurality of shoes as received for sole attaching, is wheeled into the housing 12 which is so constructed that above each rack shelf 14 there is located the metal electrode 17 which extends horizontally above and common to all of the shoe outsoles 22 which may be secured at their heel ends to the uppers 16. The electrodes 17 are interconnected by the wire 18 to one high frequency, high voltage terminal 19 of the high frequency oscillator 20.

The individual metal electrodes 21 are supported above the bottoms of the shoe uppers 16, so that the outsoles 22 lie between the electrodes 17 and 21. There is a separate electrode 21 for each shoe on the rack 9, and these electrodes 21 extend between the shoe uppers 16 and the outsoles 22.

The electrodes 21 are pivoted at 23 to the supports 24 which are bolted to the vertically extending wall 25 which preferably is of electrically non-conductive materia. Each electrode 21 through being thus pivoted at one end, can move upward at its other end to compensate for shoes having different depths, but is prevented from downward movement by blocks 21', forming part of the electrode, contacting the horizontal extension 24' of the bracket 24. The electrodes 17 are also attached by bolts to the wall 25.

The electrodes 21 are electrically connected to the contacts 26 on the selector disc 27, the contact arm 29 of which is connected by the wire 28 to the other high frequency, high voltage terminal 19 of the oscillator 20.

The contact arm 29 is attached to the rotatable shaft 30 to which there is also attached the ratchet wheel 31. The arm 32 is rotatably mounted at one end on the shaft 30, and has pivoted thereto, the ratchet pawl 33 which engages the teeth of the ratchet wheel 31. The other end of the arm 32 is pivoted to one end of the rod 34, the other end of which is attached to the electric insulator 35. The rod 36 is attached at one end to the insulator 35 and at the other end to the plunger 37 of the solenoid 38.

The contact arm 29 contacts one at a time, the contacts 26 and closes the circuit connecting one of the electrodes 17 and one of the electrodes 21 to the terminals 19 of the oscillator 20. As will be described, successive closings of the foot switch 39 will cause successive energizations of the solenoid 38, which in turn, will cause the contact arm 29 to be advanced to contact, in succession, other contacts 26 for connecting other electrodes to the oscillator 20.

The foot switch 39 which is closed when the treadle 11 is depressed, as illustrated by Fig. 1, is connected by the wire 40 to one side of the electric supply source and is connected by the wire 41 to the winding of the relay 42 which in turn is connected by the wire 43 to the other side of the electric supply source. Thus when the switch 39 is closed, the relay 42 is energized.

The electric source is connected by the wires 47 and 48 to the primary of the transformer 59, the secondaries of which supply current for heating the filaments of the vacuum tubes used in the oscillator 20 so that the filaments are heated at all times the line switch 49 is closed.

The electric source is connected by the wire 50, the armature 51 of the relay 42, the contact 52, and the wire 53 to one side of the primary of the transformer 54 in the oscillator 20, the secondary of which supplies high voltage alternating current to the anodes of the rectifier tube used in the oscillator. The other side of the primary of the transformer 54 is connected by the wire 55, the armature 45 and the contact 46 to the other side of the electric supply source.

When the switch 39 is open so that the relay 42 is deenergized, the armature 51 rests against the contact 52 so that the transformer 54 supplies current to the anodes of the rectifier of the oscillator 20 so that the vacuum tube oscillators therein oscillate for producing a high frequency electrostatic field between one of the electrodes 17 and one of the electrodes 21 as is known.

At the same time the transformer 54 is energized as described, through the armature 51 resting against the contact 52, the resistor 56 is connected by the wire 57, the contact 52, the armature 51 and the wire 50 to one side of the electric source and is connected by the armature 45 and the contact 46 to the other side of the electric source. The resistor gets hot and heats the bimetallic armature 45 causing it to warp away from the contact 46, thus opening its heating circuit and the circuit to the rectifier transformer 54 for preventing overheating of an outsole in the electrostatic field between an electrode 17 and an electrode 21 when the transformer 54 has been energized for too long a period of time. When the resistor 56 and the armature 45 cool off, the armature 45 moves again against the contact 46 and the process will be repeated if the operator has been inattentive and has not timely actuated the treadle.

The solenoid 38 is connected by the wire 60 to one side of the electric supply source and by the wire 61, the contact 62 and armature 51 (when the relay 42 is energized) and the wire 50 to the other side of the electric source.

When the operator depresses the foot treadle 11, the switch 39 is closed and closes the energizing circuit of the relay 42 causing its armature 51 to be pulled away from the contact 52 and against the contact 62. The removal of the armature 51 from the contact 52 causes the circuit from the electric source to the primary of the transformer 54 to be opened, thus discontinuing the high voltage to the rectifier anodes and as a result, the supply of high frequency voltage to the electrodes by the oscillator during the time the switch 39 is closed and the relay 42 is energized. The purpose of this is to prevent the supply of the high frequency voltage to the contact arm 29 as it is moving between adjacent contacts 26 on the selector disc 27 as will be described.

When the armature 51 moves against the contact 62 as a result of the switch 39 being closed and the relay 42 energized, the circuit including the electric source, the wire 50, the armature 51, the contact 62, the wire 61, the winding of the solenoid 38 and the wire 60, is closed and the solenoid 38 is energized and retracts the plunger 37, against the resistance of the plunger restoring spring 63. This causes the ratchet pawl 33 on the arm 32 to advance the ratchet wheel 31 the distance of one tooth and accordingly causes the contact arm 29 to move from one contact 26 to the next adjacent contact 26, the arm rotating in a clockwise direction with reference to Fig. 4.

Fig. 4 illustrates the arm 29 in contact with the selector contact 26 which is connected to the electrode 21 for the shoe 16 on the right hand end of the upper shelf 14 (Fig. 1).

The connections are arranged so that as the switch 39 is successively closed, the electrodes 21 are connected in succession into the oscillator output circuit.

Preferably, and as shown in Fig. 2 the line switch 49 is mounted on the top of the housing 12 in a position where it is operated to supply current when the door 64 is closed and to disconnect the current when the door is opened.

In operation, the door 64 of the electronic activator housing 12 is opened and the rack 9 with its shoes is wheeled into position and the outsoles 22 are located above the electrodes 21 as illustrated by Figs. 1 and 2. The rods 66 which extend laterally across the rack 9, serve to prevent the shoes from being pushed backward as the soles are entering the space between the electrodes.

The door 64 is then closed and the openings 65 therein allow the shoes within the activator to be observed, and removed as they are heated.

The neon lamps 67 are located in the door 64, one above each shoe position and serve to indicate to the operator which shoe position is being supplied with electrostatic energy. The lamps 67 are connected to the metal plates 68 which extend in substantial alignment with the electrodes 17 and sufficiently close thereto for energization of their associated lamps when the corresponding electrodes 17 are connected to the output circuit of the oscillator 20.

The inner surfaces of the outsoles and the corresponding outer surfaces of the shoe uppers have previously been coated with an adhesive such as described in said pending application. The application of the adhesive to the shoes and soles and the placement of the shoes upon the rack 9 may be accomplished in a remote location following which the rack is placed in the activator housing 12 which is positioned alongside the sole pressing machine 10 as illustrated by Fig. 1, with the switch 39 located under the treadle 11, and the electrical connections made to the electric supply source.

When the electrical connections are made to the electric source, and the door 64 is closed, an electrostatic field is produced between the electrode 17 and the electrode 21 in the first shoe position, which position has previously been described as the right hand shoe in the upper shelf 14 in the housing 12, as shown in Fig. 1. The neon lamp above this shoe glows, indicating the presence of the field.

The machine 10 may contain previously loaded shoes. The operator depresses the treadle for applying pressure to the sole of a previously loaded shoe and for causing the conveyor of the machine 10 to advance the next shoe press for the reception therein of a new shoe. The switch 39 is closed by the depression of the treadle and this causes, as previously described, the power supply current of the oscillator to be disconnected so that the high voltage to the electrodes is discontinued while the contact arm 29 of the selector disc, moves away from the contact 26 connected to the electrode 21 in the first shoe position and moves against the contact 26 which is connected to the electrode 21 in the next shoe position. The operator releases the treadle 11 and the spring biased switch 39 automatically opens, causing the relay 42 to become deenergized and causing through the relay armature 51 being released to strike the contact 52, the oscillator 20 to be energized for supplying an electrostatic field between the next in order, electrode 21 and its cooperating electrode 17.

The shoe and its heated outsole at the first position are then removed from the rack, via the opening 65 in the door 64, and is quickly inserted in the shoe press at the loading station of the machine 10, where pressure is applied to press the sole to the upper.

The above described steps are repeated for the other shoes in the activator housing 12, the shoes being removed in succession until all are removed whereupon the rack 9 is removed and another loaded one placed in position and the procedure repeated.

The operator may be called away from the machine, or otherwise become inattentive, so that the switch 39 could remain open for a sufficient period of time for the outsole placed between the active electrodes 17 and 21, to become overheated and perhaps burned. The resistor 56 however, starts to heat up as soon as the switch 39 opens, and when a period of time sufficient for proper activation of the adhesive on an outsole by the application of the electrostatic field, has passed, the heat from the resistor 56 causes the bimetallic armature 45 to warp away from the resistor 56 causing the resistor 56 to be disconnected from the electric source and causing the high voltage supply to the oscillator to be disconnected from the electrodes. The armature moves again against the contact when the resistor 56 has cooled off and reconnects the resistor to the electric source, and reconnects the high voltage transformer of the oscillator rectifier to the electric source as previously described, thus automatically preventing overheating of the outsoles.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In combination, electrostatic heating apparatus for activating adhesive applied to outsoles attached to shoes, a machine for pressing the outsoles to the shoe uppers, a plurality of pairs of electrodes between which portions of the outsoles are placed, an oscillator, means for actuating said machine for receiving, in succession, shoes from said apparatus and for pressing the outsoles thereof, in succession, to the shoe uppers, and coordinated means for substantially simultaneously connecting said pairs of electrodes in succession to the output side of said oscillator.

2. In combination, electrostatic heating apparatus for activating adhesive applied to outsoles attached to shoes, a machine for pressing the outsoles to the shoe uppers, an oscillator, a plurality of spaced electrodes arranged in a row, an electrode overlapping all of said spaced electrodes, said electrode and said spaced electrodes being arranged to receive therebetween, portions of said outsoles, means connecting said electrode to one side of the output side of said oscillator, means for actuating said machine for receiving, in succession, shoes from said apparatus and for pressing the outsoles thereof, in succession, to the shoe uppers, and coordinated means for connecting said spaced electrodes, in succession, to the other side of said oscillator.

3. In combination, electrostatic heating apparatus for activating adhesive applied to outsoles attached to shoes, a machine for pressing the outsoles to the shoe uppers, an oscillator, a plurality of spaced electrodes arranged in a row, an electrode overlapping all of said spaced electrodes, said electrode and said spaced electrodes being arranged to receive therebetween, portions of said outsoles, means connecting said electrode to one side of the output side of said oscillator, means including a foot treadle for actuating said machine for receiving in succession, shoes from said apparatus and for pressing the outsoles thereof, in succession to the shoe uppers, and coordinated means including an electric switch actuated by said treadle for connecting said spaced electrodes, in succession, to the other side of said oscillator.

4. In combination, electrostatic heating apparatus for activating adhesive applied to outsoles attached to shoes, a machine for pressing the outsoles to the shoe uppers, a plurality of pairs of electrodes between which portions of the outsoles are placed, an oscillator, energizing means for said oscillator, means for actuating said machine for receiving, in succession, shoes from said apparatus and for pressing the outsoles thereof, in succession, to the shoe uppers, and coordinated means for substantially simultaneously connecting said pairs of electrodes in succession to the output side of said oscillator and for actuating said energizing means to deenergize said oscillator.

5. In combination, electrostatic heating apparatus for activating adhesive applied to outsoles attached to shoes, a machine for pressing the outsoles to the shoe uppers, any oscillator, energizing means for said oscillator, a plurality of spaced electrodes arranged in a row, an electrode overlapping all of said spaced electrodes, said electrode and said spaced electrodes being arranged to receive therebetween, portions of said outsoles, means connecting said electrode to one side of the output side of said oscillator, means for actuating said machine for receiving, in succession, the shoes from said apparatus and for pressing the outsoles thereof, in succession, to the shoe uppers, and coordinated means for connecting said spaced electrodes, in succession, to the other side of said oscillator and for actuating said energizing means to deenergize said oscillator.

6. In combination, electrostatic heating apparatus for activating adhesive applied to outsoles attached to shoes, a machine for pressing the outsoles to the shoe uppers, an oscillator, energizing means for said oscillator, a plurality of spaced electrodes arranged in a row, an electrode overlapping all of said spaced electrodes, said electrode and said spaced electrodes being arranged to receive therebetween, portions of said outsoles, means connecting said electrode to one side of the output side of said oscillator, means including a foot treadle for actuating said machine for receiving in succession, shoes from said apparatus and for pressing the outsoles thereof, in succession, to the shoe uppers, and coordinated means including an electric switch actuated by said treadle for connecting said spaced electrodes, in succession, to the other side of said oscillator and for actuating said energizing means to deenergize said oscillator.

7. In combination, electrostatic heating apparatus for activating adhesive applied to outsoles attached to shoes, a machine for pressing the outsoles to the shoe uppers, a plurality of pairs of electrodes between which portions of the outsoles are placed, an oscillator, means for actuating said machine for receiving, in succession, the shoes from said apparatus and for pressing the outsoles thereof, in succession, to the shoe uppers, coordinated means for substantially simultaneously connecting said pairs of electrodes in succession to the output side of said oscillator, and means including time responsive means for deenergizing said oscillator for preventing the overheating of outsoles placed between the electrodes of said pairs.

8. In combination, electrostatic heating apparatus for activating adhesive applied to outsoles attached to shoes, a machine for pressing the outsoles to the shoe uppers, an oscillator, a plurality of spaced electrodes arranged in a row, an electrode overlapping all of said spaced electrodes, said electrode and said spaced electrodes being arranged to receive therebetween, portions of said outsoles, means connecting said electrode to one side of the output side of said oscillator, means for actuating said machine for receiving in succession, shoes from said apparatus and for pressing the outsoles thereat, in succession to the shoe uppers, coordinated means for connecting said spaced electrodes, in succession, to the other side of said oscillator, and means including time responsive means for deenergizing said oscillator for preventing the overheating of outsoles placed between said electrodes.

9. In combination, electrostatic heating apparatus for activating adhesive applied to outsoles attached to shoes, a machine for pressing the outsoles to the shoe uppers, an oscillator, a plurality of spaced electrodes arranged in a row, an electrode overlapping all of said spaced electrodes, said electrode and said spaced electrodes being arranged to receive therebetween, portions of said outsole, means connecting said electrode to one side of the output side of said oscillator, means including a foot treadle for actuating said machine for receiving in succession, shoes from said apparatus and for pressing the outsoles thereof, in succession to the shoe uppers, coordinated means including an electric switch actuated by said treadle for connecting said spaced electrodes, in succession, to the other side of said oscillator, and means including time responsive means for deenergizing said oscillator for preventing the overheating of outsoles placed between said electrodes.

10. In combination, electrostatic heating apparatus for activating adhesive applied to outsoles attached to shoes, a machine for pressing the outsoles to the shoe uppers, a plurality of pairs of electrodes between which portions of the outsoles are placed, an oscillator, energizing means for said oscillator, means for actuating said machine for receiving, in succession, shoes from said apparatus and for pressing the outsoles thereof, in succession, to the shoe uppers, means for connecting said pairs of electrodes in succession to the output side of said coordinated means, for actuating said energizing means to deenergize said oscillator, and means including time responsive means for actuating said coordinated means to deenergize said oscillator for preventing the overheating of outsoles placed between electrodes of said pairs.

MICHAEL G. STRATTON.